United States Patent [19]
Suyama

[11] Patent Number: 6,062,597
[45] Date of Patent: May 16, 2000

[54] AIR BELT DEVICES

[75] Inventor: Yoji Suyama, Echi-gun, Japan

[73] Assignee: Takata Corporation, Tokyo, Japan

[21] Appl. No.: 09/145,295

[22] Filed: Sep. 2, 1998

[30] Foreign Application Priority Data

Sep. 2, 1997 [JP] Japan ................................... 9-236908

[51] Int. Cl.[7] ................................................ B60R 21/18
[52] U.S. Cl. .......................................... 280/733; 280/808
[58] Field of Search .................................. 280/733, 807, 280/808

[56] References Cited

U.S. PATENT DOCUMENTS

| | | | |
|---|---|---|---|
| 3,682,498 | 8/1972 | Rutzki | 280/733 |
| 3,791,670 | 2/1974 | Lucore et al. | 280/733 |
| 3,801,156 | 4/1974 | Granig | 280/733 |
| 3,861,712 | 1/1975 | Matsui et al. | 280/735 |
| 3,897,081 | 7/1975 | Lewis | 280/733 |
| 3,929,348 | 12/1975 | Lawwill | 280/733 |
| 5,445,411 | 8/1995 | Kamiyama et al. | 280/733 |
| 5,597,178 | 1/1997 | Hardin, Jr. | 280/733 |
| 5,765,869 | 6/1998 | Huber | 280/807 |

FOREIGN PATENT DOCUMENTS

| | | | |
|---|---|---|---|
| 2813285 | 11/1979 | Germany | 280/733 |
| 5-85301 | 4/1993 | Japan . | |

*Primary Examiner*—Paul N. Dickson
*Assistant Examiner*—Michael Britton
*Attorney, Agent, or Firm*—Foley & Lardner

[57] ABSTRACT

Ducts 66 are housed in a housing 46 of a buckle 12. When plugs 20 of a tongue 10 are inserted into plug receiving bores 48, gas outlets 72 of ducts 66 engage plugs 20. Check doors 50 that open and close are arranged on the plug receiving bores 48 of the buckle 12. Check covers 74 including flexible pieces 76 are arranged at tips of the ducts 66 and are open by gas pressure. When a gas generator 16 is actuated with the tongue 10 separated from the buckle 12, gas is discharged downward from gas relief ports 60. The check doors 50 and the check covers 74 prevent the entrance of foreign matters.

5 Claims, 6 Drawing Sheets

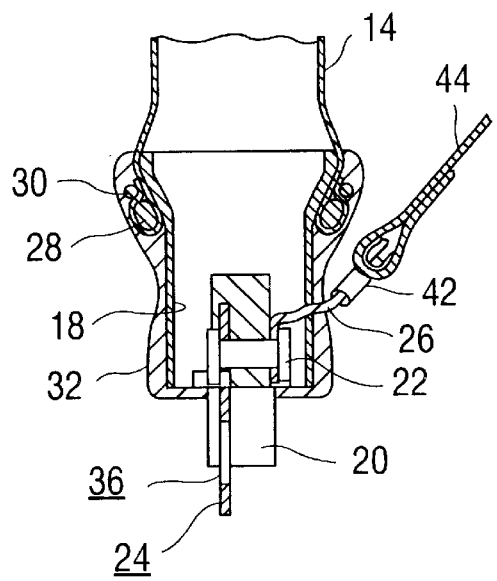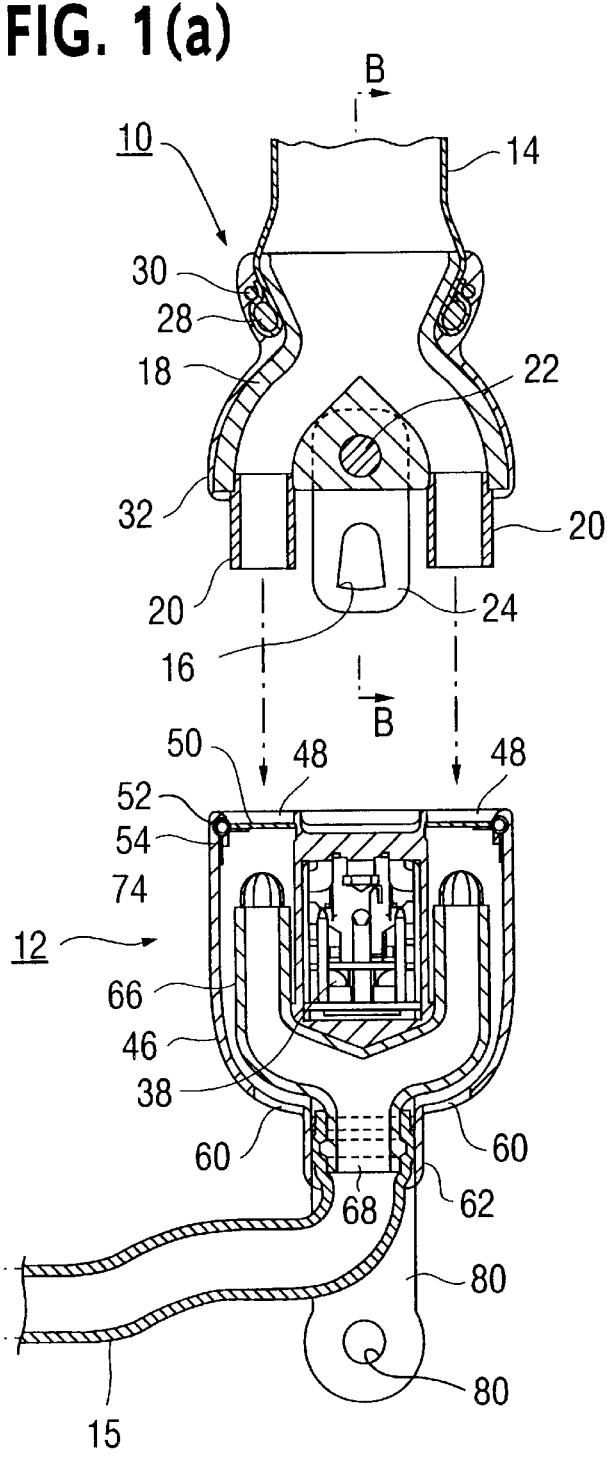

GAS

AIR BELT DEVICES

BACKGROUND OF THE INVENTION

The present invention relates to seat belt devices for protecting automobile passengers during collisions, and more particularly, to an air belt device having a bag-like portion, which is inflated by a gas generator. Further particularly, the present invention pertains to an air belt device that copes with erroneous functioning of a gas generator.

Japanese Unexamined Patent Publication No. 5-85301 describes a prior air belt device. FIG. 6(a) shows a perspective view of the air belt device. FIG. 6(b) shows a cross-sectional view of the air belt device taken along line B—B in FIG. 6(a).

As shown in the drawings, an air belt 1 includes a shoulder belt 2, a lap belt 3, a buckle 4, a tongue 5, and an intermediate guide 6. The shoulder belt 2 extends diagonally from the right side of a passenger to the left side of the passenger. The lap belt 3 extends from the right side of a passenger to the left side. The buckle 4 is arranged, for example, on the vehicle floor. The tongue 5 is engaged with the buckle 4 when fastening the seat belt. The intemediate guide 6 guides the shoulder belt 2.

The shoulder belt 2 includes a normal belt 2a which is an ordinary seat belt, and a bag-like belt 2b, which is connected to one end of the normal belt 2a. The normal belt 2a slides freely through the intermediate guide 6. The other end of the normal belt 2a is connected with a seat belt retractor 7 having an emergency lock system (ELR)mechanism. The normal belt 2a is wound into the seat belt retractor 7.

The bag-like belt 2b is located at a portion that contacts a passenger and is connected with one end of the tongue 5. The opposite end of the tongue 5 is not connected with the normal belt 2a.

The lap belt 3 is formed by a normal belt, which is an ordinary seat belt. One end of the lap belt 3 is connected with the tongue 5. The other end of the lap belt 3 is connected with the seat belt retractor 8 (ELR) . The buckle 4 is connected with a gas generator 9, which generates high pressure gas during emergencies, such as when a collision occurs.

The gas generated by the gas generator 9 flows toward the bag-like belt 2b through a passage extending through the tongue 5 and the buckle 4.

The bag-like belt portion 2b of the shoulder belt 2 has a body 2c. The body 2c, for example, may be folded and covered by a cover 2d, as shown by the solid line in FIG. 6(b). The sides of the cover 2d are sewed to each other such that a stitching 2e is formed. This keeps the shoulder belt 2 in a strip-like state under normal situations. The stitching 2e of the cover 2d is easily opened by the inflation force of the shoulder belt 2 when the gas generator 9 is actuated. The bag-like belt 2b inflates, as shown by the dashed line in FIG. 6(b).

In the prior air belt device 1 described above, if the gas generator 9 is actuated when the tongue 5 is not inserted in the buckle 4, the generated gas is discharged upward from the buckle 4.

SUMMARY OF THE INVENTION

Accordingly, the first objective of the present invention is to provide an air belt device that discharge gas sideward or downward, if a gas generator is actuated with the tongue and buckle in a separated state.

A second objective of the present invention is to provide an air belt device which prevents foreign matters from entering buckle.

To achieve the above objectives, the present invention provides an air belt device including an inflatable air belt, a tongue to which an end of the air belt is connected, a buckle engagable with the tongue, gas passages respectively formed within the buckle and the tongue and a gas generating device for supplying gas to the gas passage of the buckle, said air belt device being characterized in that said tongue includes cylindrical plugs each having the gas passage therein, aid buckle includes plug receiving bores each receiving the plug and having a check door inwardly openable based on reception of the plug and outwardly unopenable, said buckle includes a gas release port for discharging the gas from the gas supplying device downward or sideward, and said gas is introduced into the plug upon the operation of the gas generating device in a tongue-connecting state in which the plug is inserted in the buckle, and released from the gas release port upon the operation of the gas generating device when the check door is in a closed position and the tongue is separated from the buckle.

In such an air belt device, a tongue receiving opening of the buckle is closed with a check door, when the tongue is not engaged with the buckle. This prevents foreign matters such as dust, dirt and sand from entering the inside of the buckle. If foreign matters in small sizes should enter the inside of the buckle, these foreign matters can be discharged from a relief ports. When each relief port is arranged in the downward direction under the buckle, the foreign matters that enter the inside of the buckle fall down from the relief port.

In the present invention, it is preferable that ducts and valves are respectively disposed in the buckle. Each of the ducts includes a gas inlet and a gas outlet, wherein the gas outlet is located in the vicinity of the associated plug receiving bore. Each of the valves is disposed in the gas outlet of the duct. Each valve is open when gas pressure is exerted and closed when gas pressure is not exerted. When the tongue is received in the buckle, gas can communicate between the plug, which is received in the buckle, and the gas outlet of the duct.

It is preferable that said valve comprises a plurality of shoulder portions each deformable to open the gas outlet based on the gas pressure.

Under the above configuration, it is preferable that each of said shoulder portions has a distal end entering the plug received in the buckle when the shoulder portion is deformed by the gas pressure in case the tongue is coupled to the buckle. The shoulder portions having ends in the plug causes the connecting portion of the duct and the plug to be covered by the shoulder portions, thus, the gas coming out from the duct flows smoothly into the plug.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention FIG. 1(a) is a cross-sectional view showing a tongue and a buckle of an embodiment of the present invention;

FIG. 1(b) is an enlarged cross-sectional view of FIG. 1(a) taken along line B—B;

DETAILED DESCRIPTION OF THE PREFERRED EMBODIMENT

An embodiment of the present invention will be described in the following with reference to the accompanying drawings.

Figure 2:
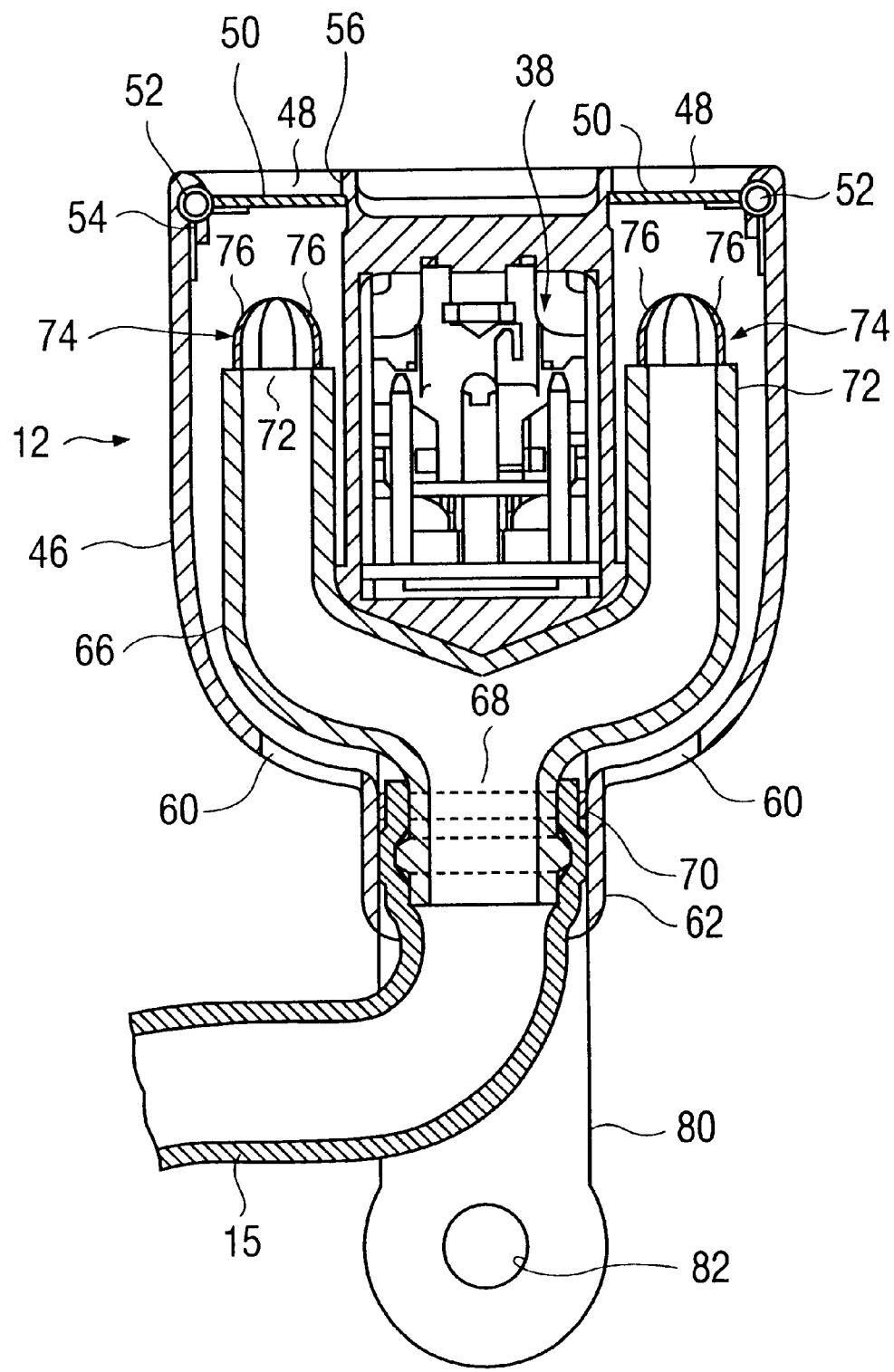
FIG. 2 is an enlarged cross-sectional view showing the buckle.
Figure 3:
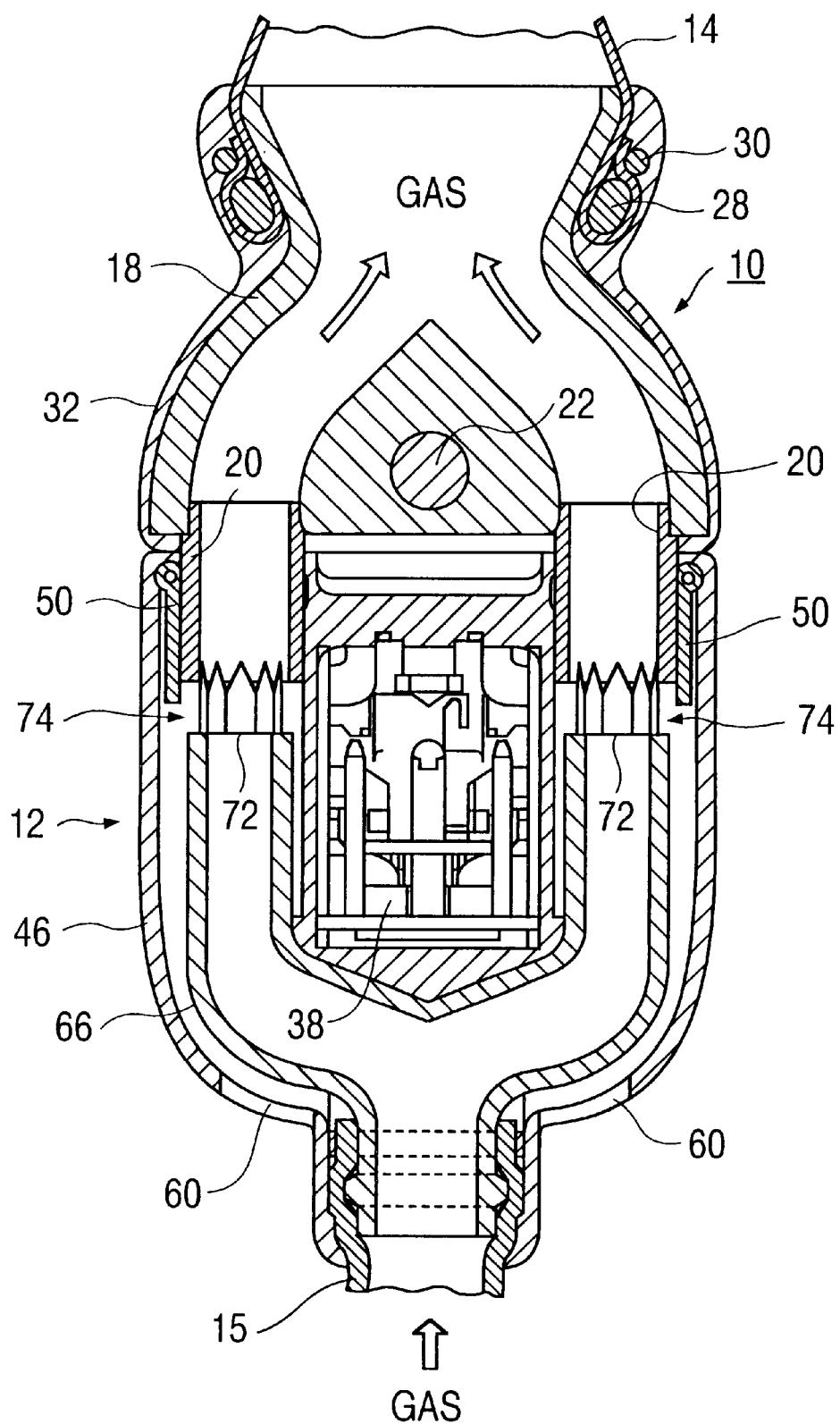
FIG. 3 is a cross-sectional view showing the engagement between the tongue and the buckle.
Figure 4:
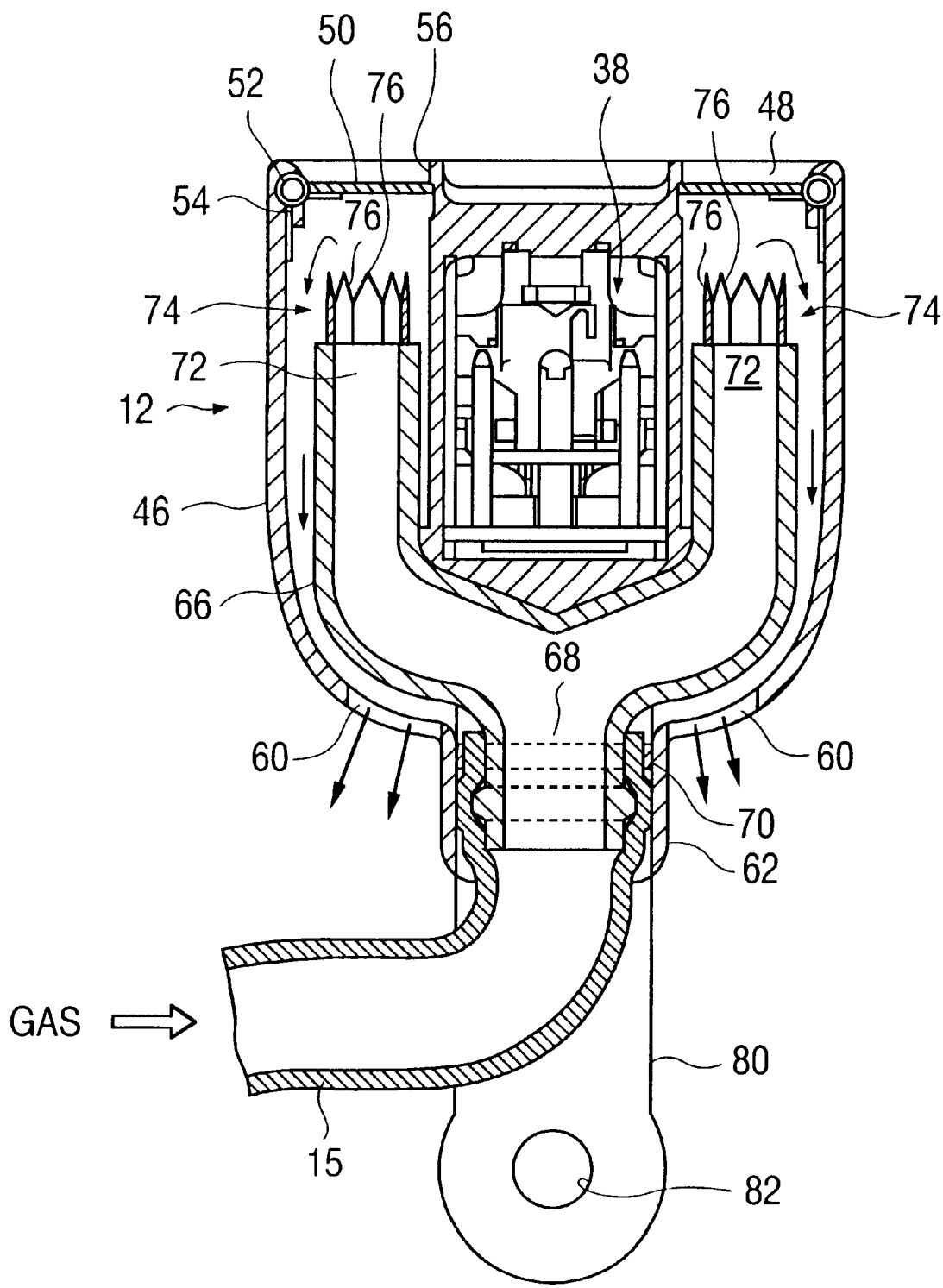
FIG. 4 is a cross-sectional view showing the buckle separated from the tongue when a gas generator is actuated.
Figure 5A:
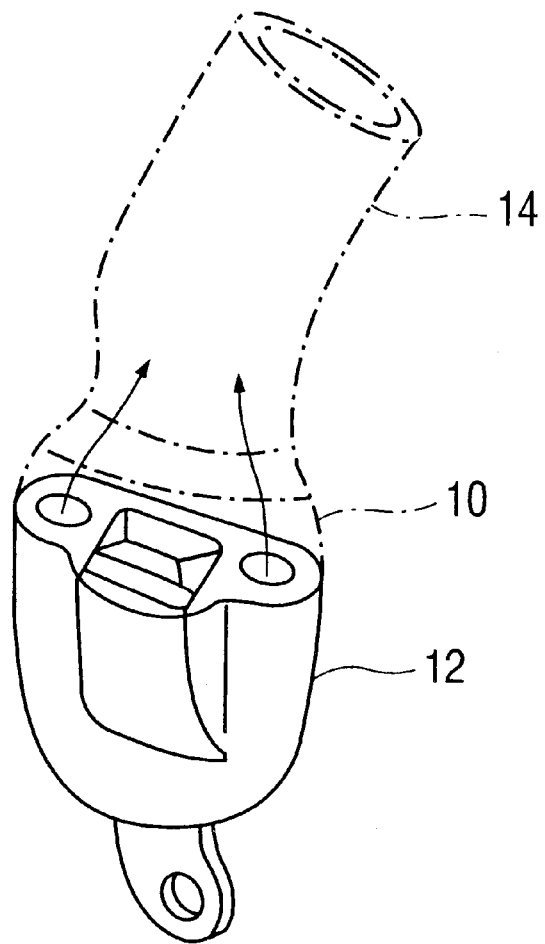
FIG. 5(a) is a perspective view showing the buckle with gas flowing when the gas generator is actuated while the buckle is engaged with the tongue.
Figure 5B:
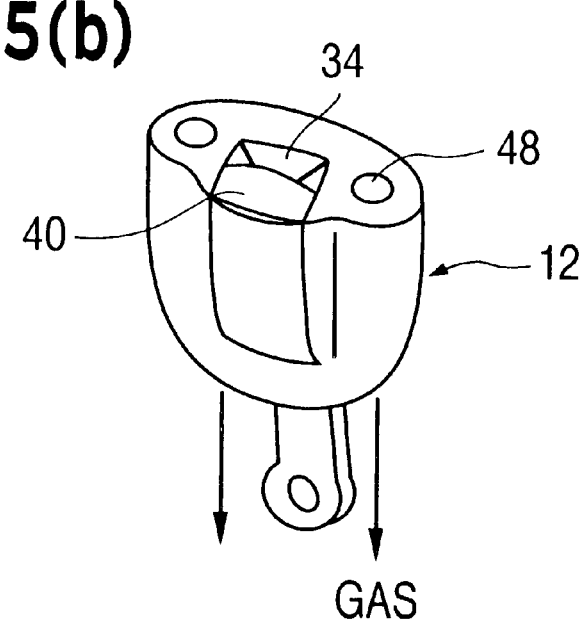
FIG. 5(b) is a perspective view showing the buckle with gas flowing when the gas generator is actuated while the buckle is not engaged with the tongue.
Figure 6A:
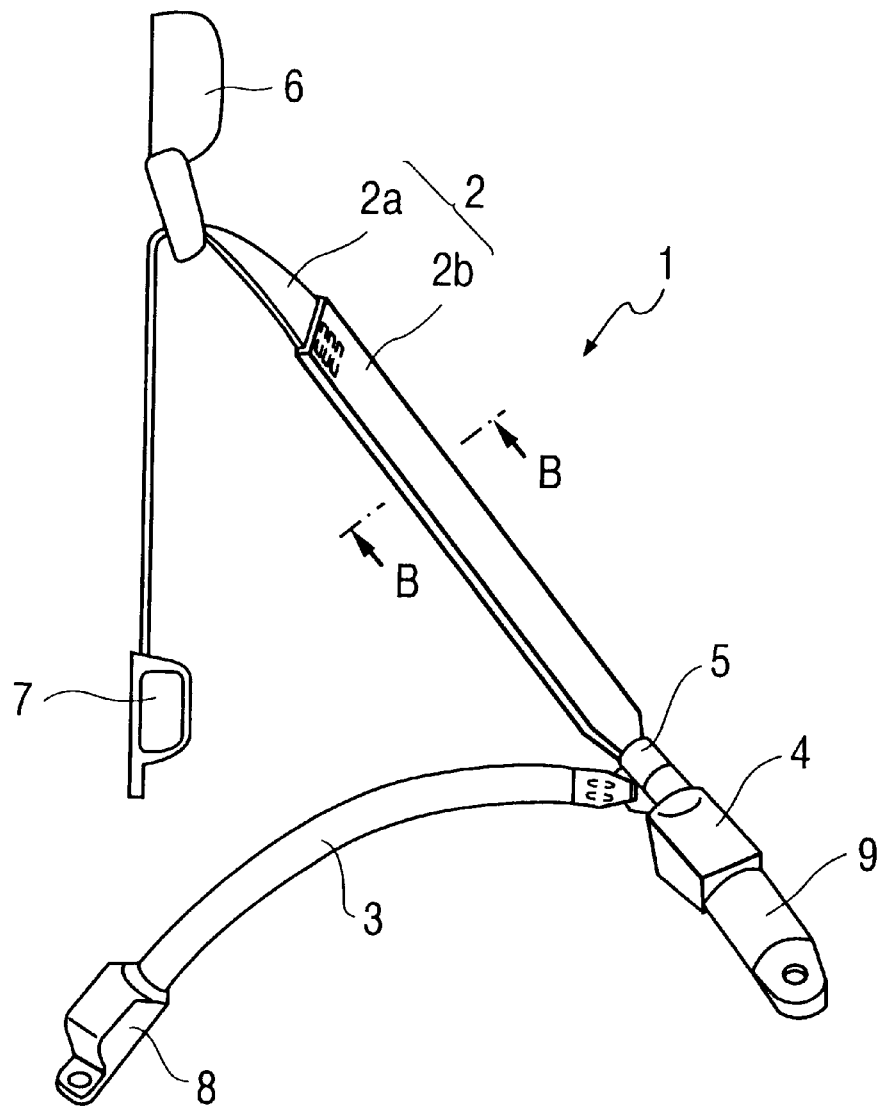
FIG. 6(a) is a perspective view showing an ordinary seat belt configuration.
Figure 6B:
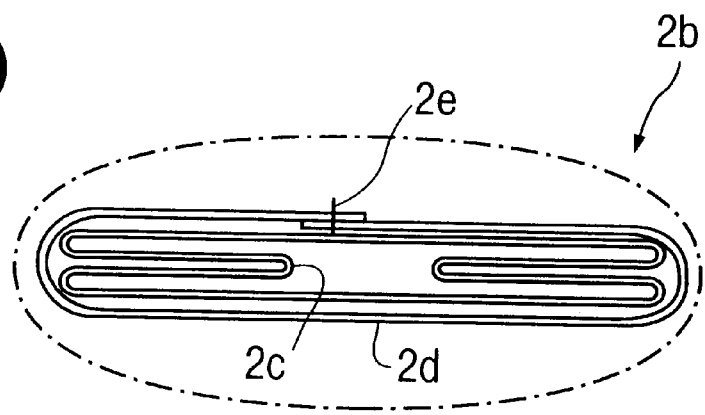
FIG. 6(b) is an enlarged cross-sectional view of the belt of FIG. 6(a) taken alone line B—B.

FIG. 1(b) is an enlarged cross-sectional view of FIG. 1(a) taken along line B—B; FIG. 2 is an enlarged cross-sectional view showing the buckle; FIG. 3 is a cross-sectional view showing the engagement between the tongue and the buckle; FIG. 4 is a cross-sectional view showing the buckle separated from the tongue when a gas generator is actuated; FIG. 5(a) is a perspective view showing the buckle with gas flowing when the gas generator is actuated while the buckle is engaged with the tongue; FIG. 5(b) is a perspective view showing the buckle with gas flowing when the gas generator is actuated while the buckle is not engaged with the tongue; and FIG. 6 is a perspective view showing an ordinary seat belt configuration.

An air belt device includes a tongue 10, a buckle 12, a gas generator 16, and other parts. The rear end of the tongue 10 is connected with an air belt 14. The buckle 12 is inserted into the tongue 10. The gas generator 16 supplies gas to the buckle 12 through a hose 15. The tongue 10 includes a tongue base 18, hollow cylindrical plugs 20, a tongue plate 24, an anchor 26, rings 28, 30, a plastic cover 32, etc. The tongue base 18 is hollow. The hollow cylindrical plugs 20 protrude from the front end of the tongue base 18. The tongue plate 24 and the anchor 26 are each connected with the tongue base 18 by a connecting pin 22. The rings 28, 30 fix the air belt device 14 to the tongue base 18. The plastic cover 32 covers the tongue base 18.

When the tongue plate 24 is inserted into a tongue receiving opening 34 (FIG. 5) of the buckle 12, a latch hole 36 of the tongue plate 24 is engaged with a latch of a latch mechanism 38 housed in the buckle 12. The latch is disengaged from the latch hole 36 by pressing a button 40 arranged on the buckle 12. The tongue plate 24 is forcibly separated from the buckle 12 by a spring (not shown).

A hole 42 is defined in the anchor 26. A lap belt 44 is connected with the anchor 26 by inserting one end of the lap belt 44 into the hole 42 of the anchor 26. The rear end of the lap belt 44 is arranged so that the lap belt 44 is wound into a seat belt retractor.

In this embodiment, the air belt device 14 constitutes a portion of the seat belt. The rear end of the air belt 14 is engaged with the front end of a webbing which constitutes a portion of the shoulder belt. The rear end of the webbing is arranged so that the webbing is wound into the seat belt retractor.

The buckle 12 is housed in a housing 46. An opening 34 for receiving the tongue plate 24 and bores 48 for receiving the plugs 20 are arranged in the front end of the housing 46.

The plug receiving bores 48 are closed by check doors 50. Each check door 50 is pivotally connected with the housing 46 by a hinge pin 52 and is forced to a closed position by a spring 54.

When each plug 20 is inserted into the corresponding plug receiving bore 48, the check door 50 is pushed open by the plug 20 as shown in FIG. 3. When the plug 20 is pulled out of the bore 48, the check door 50 returns to the closed position by the force of the spring 54.

When each check door 50 is located at the closed position as shown in FIGS. 1, 2, the distal end of the check door 50 is engaged with a stopper 56 arranged in the housing 46 so that the check door 50 is prevented from opening outward from the housing 46.

Gas relief ports 60 and a port 62 for receiving a hose 15 are arranged at the rear (lower) end of the housing 46.

A duct 66 is arranged in the housing 46. An gas inlet 68 of the duct 66 is inserted into the hose receiving port 62. An end of the hose 15 is fixed to the gas inlet 68 of the duct 66 by means of a ring 70.

The inside of the housing 46 is devided into two parts. The duct 66 is bifurcated accordingly. A check cover 74 is arranged on a gas outlet 72 at the distal end of each part of the duct 66.

Each check cover 74 includes a plurality of flexible pieces 76 that are fixed to the end faces of two separated parts of the duct 66, by applying an adhesive or by fusing the pieces 76. The flexible pieces 76 contact one another to close the gas outlets 72 when gas pressure is not applied to the flexible pieces 76. The distal ends of the flexible pieces 76 are separated from each other when gas pressure is applied so that each check cover 74 is opened as shown in FIGS. 3, 4.

When the flexible pieces 76 are deformed to open with each plug 20 inserted into the corresponding plug receiving bore 48, as shown in FIG. 3, the distal end of each flexible piece 76 enters the plug 20.

A bracket 80 is arranged to protrude downward from the housing 46. The buckle 12 is fixed to a body member of a vehicle by inserting a bolt into a hole 82 that is arranged in the bracket 80.

In the above air belt device, the tongue 10 is engaged with the buckle 12 as shown in FIG. 3. The tongue plate 24 is inserted into the tongue receiving opening 34 and is latched with the latch mechanism 38. The distal ends of the plugs 20 enter the plug receiving bores 48 and enagages the gas outlets 72 of the ducts 66. The check doors 50 are pushed open into the housing 46 by the plugs 20.

If the gas generator 16 is actuated when the tongue 10 is connected with the buckle as shown in FIG. 3, the gas passes through the hose 15 and the duct 66. The gas advances by deforming the flexible pieces 76 and by opening the check covers 74. The gas, then, flows into the inside of the air belt device 14. This inflates the air belt device 14.

In this embodiment, the distal ends of the flexible pieces 76 are inserted into the plugs 20. The portion connecting each plug 20 and the associated duct outlet 72 is encircled with the flexible pieces 74 so that the gas inside the ducts 76 can be smoothly provided into the air belt 14 through the plugs 20.

If the gas generator 16 is erroneously actuated when the tongue 10 is separated from the buckle 12, the gas flows into the duct 66 through the hose 15. The gas, then, flows into the housing 46 by opening the flexible pieces 76. Since the check doors 50 are closed and do not open outward from the housing 46, the gas passes portions connecting the ducts 66 and the housing 46. The gas is finally discharged downward from the relief ports 60. Accordingly, if the gas generator 16 is erroneously actuated when the tongue is separated from the buckle, the gas is discharged from the buckle 12 downward. This prevents the passenger from being blasted by the gas.

In this embodiment, when the buckle 12 is not engaged with the tongue 10, the check doors 50 close the plug receiving bores 48. Therefore, foreign matters are prevented from enter the housing 46 through the plug receiving bores 48. If holes are formed in the check doors 50 when the foreign matters enter the housing 46, the foreign matters would fall down from the relief ports 60. Moreover, the gas outlets 72 of the ducts 66 are closed by the check covers 74 so that foreign matters can not enter the ducts 66.

Foreign matters are prevented from entering the housing 46 and the ducts 66. Therefore, the tongue 10 engages the buckle 12 smoothly. Foreign matters carried by the gas when the air belt device is actuated are also prevented from entering the air belt device.

In this embodiment, the relief ports 60 open downward under the housing 46. Alternatively, the relief ports 60 may open sideways or diagonally downward. However, if the relief ports 60 are arranged with the downward openings, the gas is discharged downward. This ensures that the gas discharged from the relief ports is prevented from being blasted against a passenger. Moreover, if foreign matters enter the inside of the housing 46, the foreign matters fall down from the relief ports 60, as described above.

It should be apparent to those skilled in the art that the present invention may be embodied in any other specific forms without departing form the spirit or scope of the invention. Therefore, the present examples and embodiments are to be considered as illustrative and not restrictive and the invention is not to be limited to the details given herein, but may be modified within the scope and equivalence of the appended claims.

This application is one of seven copending applications filed on even date herewith:

| U.S. Ser. No. | Our Docket No. | Japanese No. |
|---|---|---|
| Unknown | 086142/0203 | 09-236903 |
| Unknown | 086142/0204 | 09-236904 |
| Unknown | 086142/0205 | 09-236906 |
| Unknown | 086142/0206 | 09-236907 |
| Unknown | 086142/0207 | 09-236908 |
| Unknown | 086142/0208 | 09-236909 |

-continued

| U.S. Ser. No. | Our Docket No. | Japanese No. |
|---|---|---|
| Unknown | 086142/0209 | 09-236910 |

The instant application hereby incorporates by reference the entire specification including claims and abstract and the drawings of each of the other six applications.

What is claimed is:

1. An air belt device including an inflatable air belt, a tongue to which an end of the air belt is connected, a buckle engagable with the tongue, gas passages respectively formed within the buckle and the tongue and a gas generating device for supplying gas to the gas passage of the buckle, said air belt device being characterized in that said tongue includes plugs each having the gas passage therein, said buckle includes plug receiving bores each receiving the plug and having a check door inwardly openable based on reception of the plug and outwardly unopenable;

said buckle includes a gas release port for discharging the gas from the gas supplying device downward or sideward; and said gas is introduced into the plug upon the operation of the gas generating device in a tongue-connecting state in which the plug is inserted in the buckle, and released from the gas release port upon the operation of the gas generating device when the check door is in a closed position and the tongue is separated from the buckle.

2. An air belt device as set forth in claim 1, characterized in that ducts and valves are respectively disposed in the buckle;

each of said ducts includes a gas inlet and a gas outlet, wherein said gas outlet is located in the vicinity of the associated plug receiving bore;

each of said valves is disposed in the gas outlet of the duct, wherein said valve is open based on gas pressure and closed without load of the gas pressure; and said plug received in the buckle and the gas outlet of the duct are capable of communicating with each other when the tongue is received in the buckle.

3. An air belt device as set forth in claim 2, characterized in that said valve comprises a plurality of shoulder portions each deformable to open the gas outlet based on the gas pressure.

4. An air belt device as set forth in claim 3, characterized in that each of said shoulder portions has a distal end entering the plug received in the buckle when the shoulder portion is deformed by the gas pressure in case the tongue is coupled to the buckle.

5. An air belt device as set forth in claim 4, characterized in that said relief bore is directed downward in a lower portion of the buckle.

\* \* \* \* \*